(12) United States Patent
Powell et al.

(10) Patent No.: US 6,904,928 B2
(45) Date of Patent: Jun. 14, 2005

(54) VAPOR VENT VALVE FOR FUEL PUMP MODULE

(75) Inventors: Patrick Powell, Farmington Hills, MI (US); Takehiro Nagase, Yuki (JP); Tetsuya Takahashi, Kawachi-gun (JP)

(73) Assignees: DENSO International America, Inc., Southfield, MI (US); Kyosan Denki Co., Ltd., Okazato (JP)

( * ) Notice: Subject to any disclaimer, the term of this patent is extended or adjusted under 35 U.S.C. 154(b) by 0 days.

(21) Appl. No.: 10/694,254

(22) Filed: Oct. 27, 2003

(65) Prior Publication Data

US 2005/0087227 A1    Apr. 28, 2005

(51) Int. Cl.[7] ............................................. F16K 24/04
(52) U.S. Cl. ...................... 137/202; 137/587
(58) Field of Search .............................. 137/202, 587

(56) References Cited

U.S. PATENT DOCUMENTS

| 5,590,697 A | 1/1997 | Benjey et al. |
| 5,666,989 A | 9/1997 | Roetker |
| 5,762,090 A | 6/1998 | Halamish et al. |
| 5,782,258 A | 7/1998 | Herbon et al. |
| 6,145,532 A | 11/2000 | Tuckey et al. |
| 6,308,732 B1 | 10/2001 | Herndon |
| 6,311,675 B2 | 11/2001 | Crary et al. |
| 2002/0174902 A1 * | 11/2002 | Beyer et al. ................. 137/587 |

* cited by examiner

Primary Examiner—Gerald A. Michalsky
(74) Attorney, Agent, or Firm—Harness, Dickey & Pierce, PLC

(57) ABSTRACT

A vapor vent valve for a fuel pump module, wherein the valve assembly attaches directly to the bottom side of the fuel pump module flange within the interior volume of the fuel tank. When rising fuel exerts a force on the valve assembly pushing the float assembly upwards, the valve head attached to the float assembly seals directly against a valve seat on the underside of the modular flange, covering the vapor release aperture located through the flange, preventing fuel from escaping through the vent aperture. In providing a direct seal of the valve head against the modular flange, additional sealing means and potential emission sources between the valve housing and the modular flange are eliminated.

10 Claims, 1 Drawing Sheet

VAPOR VENT VALVE FOR FUEL PUMP MODULE

FIELD OF THE INVENTION

The present invention relates to low-emission fuel vapor venting systems. Specifically, the invention relates to minimizing potential emission by incorporating a vapor vent valve in the fuel pump modular flange.

BACKGROUND OF THE INVENTION

Controlling fuel vapor in vehicle fuel tanks has long been an objective for automobile manufacturers and suppliers of fuel systems components. Fuel vapor can be created in the fuel tank by temperature differences between the fuel tank and liquid fuel from a fuel pump, as well as by sloshing and agitation of the fuel tank during normal vehicle operation. The fuel vapor collects in the space above the fuel within the tank and is normally released through one or more vent valves located within the wall of the fuel tank. This prevents pressurization of the tank or the creation of a vacuum therewithin as a result of fluctuations in fuel volume due to changes in temperature, atmospheric pressure, or the drop in fuel level as it is drawn off by the engine.

With the increasing requirements and regulations to reduce emissions, where vent valves used to be mounted through separate apertures in the fuel tank from the fuel pump flange, it now becomes advantageous to incorporate them with the fuel pump mounting flange thereby eliminating the need for additional holes through the tank and potential vapor emission sources.

Such practice is known in the art to incorporate the vent valve in the modular flange as mentioned above. Current valve designs utilize a valve housing that attaches to the modular flange with an O-ring seal disposed there between the housing and the flange for reducing emissions. When actuated, the valve float assembly makes contact with the upper wall of the valve housing, sealing off the vapor/fuel outlet through the valve housing. Unfortunately there is the potential that vapor or fuel may still bypass the valve housing and O-ring seal either through a faulty seal or permeation, even when the valve is in the closed position, creating undesired emissions. It is therefore more advantageous to incorporate a vent valve with the modular flange in a manner which would eliminate the need for the second seal between the valve housing and the modular flange, by creating a valve assembly that operates directly against the modular flange, thereby reducing a potential emission source, as well as lowering production costs and minimizing parts.

SUMMARY OF THE INVENTION

It is therefore an object of the present invention to reduce fuel vapor emissions from a fuel tank ventilation system by providing a fuel pump modular flange having one or more vapor valves directly incorporated within, thereby eliminating the need for additional holes through the fuel tank.

It is another object of the present invention to provide for a means for reducing permeation emissions of fuel vapor by eliminating an unnecessary sealing point between a vent valve housing and a fuel pump module flange.

Another object of the present invention is to provide a vent valve assembly wherein the valve assembly operates directly against the fuel pump modular flange in sealing off the vent outlet.

A further object of the present invention is to provide a means of attaching a vapor vent so as to allow a vent valve to operate directly against the fuel pump modular flange, preventing fuel/vapor from bypassing the valve housing.

The foregoing objects are achieved by a fuel pump module flange providing for the direct attachment of a vapor vent valve. The vent valve is designed to seal directly against a valve seat on the bottom side of the modular flange, eliminating the need for a second seal between the valve housing and the flange. The result of this design is less complication, lower cost, and improved quality by the reduction in potential leakage paths by the elimination of the second seal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Fuel pump modules operate as a means for delivering fuel stored within a fuel tank to the fuel lines for combustion by the engine. They generally embody a pump element attached to a flange for mounting the module through an aperture in the fuel tank wall. The flange seals off the interior volume of the fuel tank to prevent spillage of the fuel stored within. As the fuel is spent, fuel vapor builds up within the fuel tank and must be vented to a specific location outside of the fuel tank to prevent vapor-lock. It has become advantageous to incorporate a vapor vent valve within the modular flange, providing the means of venting the fuel vapors while eliminating the need for an additional aperture through the tank wall, and additionally, another potential source for emissions. Thus, it is the primary object of the present invention to provide an improved means of attaching and incorporating the vapor vent valve to the modular flange so as to minimize the potential for emissions at the point of attachment, therein reducing overall vehicle emissions levels.

Figure 1:
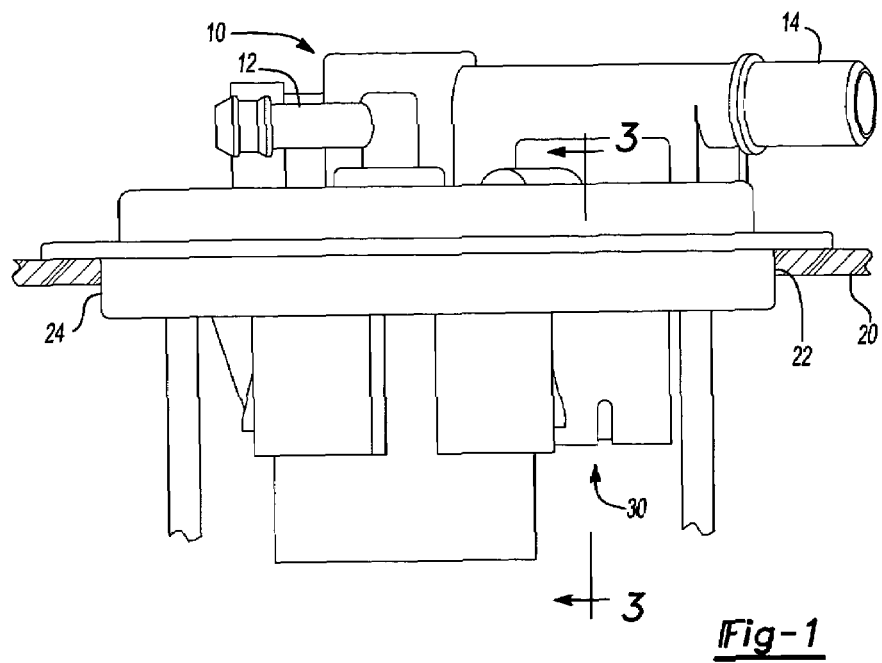
FIG. 1 shows a partial sectional side view of a fuel pump module flange mounted to a fuel tank.

Referring now to the figures of the present invention, FIG. 1 illustrates the improved means of incorporating and attaching a vapor vent valve 30 to a fuel pump modular flange 10 attached to a wall of a vehicle fuel tank 20, thereby minimizing potential fuel vapor emission. As illustrated, the modular flange 10 is attached to a fuel tank 20 through an aperture in the tank wall defined by edges 22 and 24. Generally the flange is located on the top wall of the tank 20, but may be located elsewhere depending on each individual fuel system application. The modular flange 10 provides the means for fuel lines 12 to deliver fuel to and from the engine, and is generally incorporated with an internal or external fuel pump not illustrated, but attached thereto. The flange further functions as a seal with the fuel tank 20, isolating the internal volume of the fuel tank from the outside atmosphere thereby minimizing fuel vapor emissions.

Attached to the underside of modular flange 10 within the fuel tank one or more fuel vapor vent valves 30 are attached, enabling excess fuel vapor to exit the fuel tank 20 through outlet 14 located on the top side of the flange 10. The outlet 14 subsequently attaches to a fuel vapor line which carries the vapor to either the engine for combustion or to a remotely mounted storage canister. Often times, multiple vapor valves are utilized in a single fuel tank providing for the collection of fuel vapor from additional locations within the fuel tank, which are subsequently combined.

Figure 2:
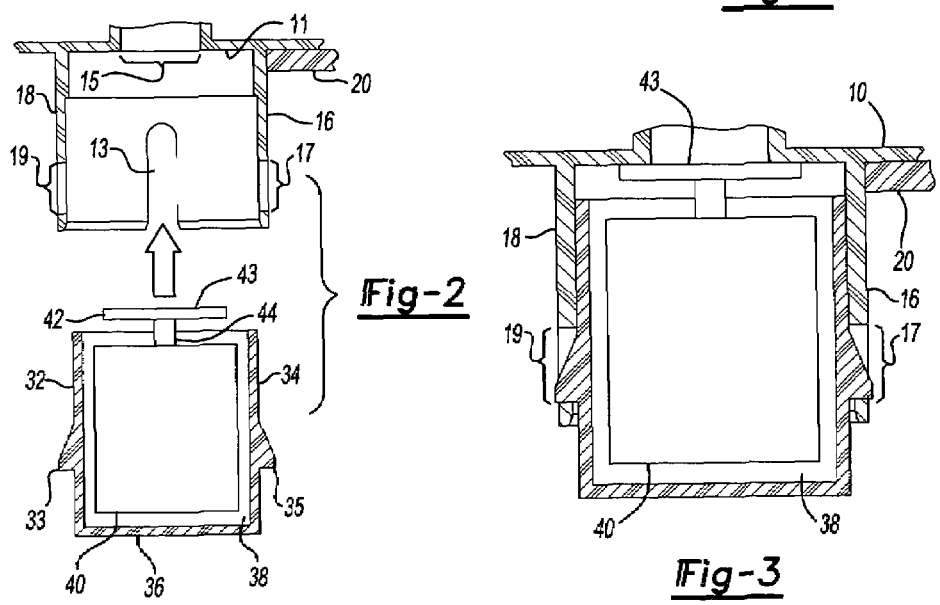
FIG. 2 is a cross-sectional side view of the vapor vent valve body separated from the receiving portion of the modular flange.

Referring now to FIG. 2, a cross-sectional view of the vent valve 30 separated from the mounting location of the modular flange 10 is shown. Specifically, the modular flange 10 embodies a pair of downward protruding legs 16 and 18 on the underside thereof, defining an area there between for receiving the vapor vent valve assembly 30. The valve assembly 30 comprises a housing 36 defined by at least two side walls 32 and 34 which hold the float assembly 40 slidably there within. The bottom of the housing 36 further acts as a float stopping means, preventing the float 40 from completely sliding out of the housing 36. The side walls 32 and 34 of the housing 36 comprise tabs 33 and 35 protruding radially outward from the surface thereof, which are received through apertures 17 and 19 located on legs 16 and 18 of modular flange 10, thereby providing a securing means of attaching the valve assembly 30 to the flange 10. The legs 16 and 18 can be biased apart manually to release the valve assembly 30 if the need should arise for repair or replacement.

The float assembly 40 received within the valve assembly housing 36 attaches to the valve head 42 by a support means 44. Attaching the valve assembly 30 to the flange 10 comprises positioning the assembly 30 below the legs 16 and 18 so as to vertically align tabs 33 and 35 on the housing 36 with apertures 17 and 19 of the legs 16 and 18. The housing 36 containing the float assembly 40 is then inserted upwards between the legs 16 and 18, whereby contact with the tabs 33 and 35 on the housing 36 forces the legs to deflect apart. Once fully inserted, the tabs are received through the apertures 17 and 19, allowing the legs 16 and 18 to snap back to their original, parallel dispositions, thereby securing the valve assembly 30 to the flange 10.

Figure 3:
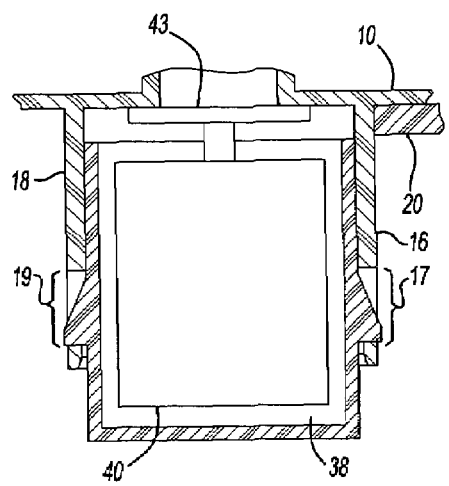
FIG. 3 is a cross-sectional side view of the vapor vent valve attached to modular flange in the closed position.

Referring now to FIG. 3 with reference to FIG. 2, the cross-sectional view of the valve assembly 30 attached to the modular flange 10 is shown. The float assembly 40 is illustrated in the fully raised position wherein the valve surface 43 of the valve head 42 is abutting the valve seat 11 of the modular flange 10, sealing off the aperture 15 leading to the vapor outlet 14 and yielding a gap 38 between the bottom of the float assembly 40 and the valve housing 36. This closed position occurs when fuel within the tank 20 is raised up into the valve assembly 30, forcing the buoyant float assembly to rise up vertically sealing the valve head 42 against the valve seat 11 of the flange 10, preventing fuel or vapor from escaping through aperture 15 during this time. When the raising of the fuel subsides and bouyancy force is no longer exerted on the float assembly 40 by the fuel, the float assembly 40 slides down by gravitational force, or through the assistance of a coil spring not illustrated, thereby releasing the seal between the valve head 42 and the valve seat 11 and allowing vapor to continue to flow through aperture 15. In providing a means for the valve surface 43 to act directly with the valve seat 11 of the modular flange 10, no additional sealing means is required between the valve housing 36 and the valve seat 11 of the modular flange 10 thereby eliminating an unnecessary potential source for vapor emissions and fuel leakage.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vapor vent valve for a fuel pump module comprising:
a valve assembly, said valve assembly releasably attaching to a bottom side of a fuel pump modular flange mounted to a fuel tank, said modular flange having a bottom side as a valve seat, said valve seat defining a circumferential area around an aperture through the modular flange, said modular flange having at least one valve assembly attachment means proximal to the valve seat on the bottom side of said modular flange for attachment of the valve assembly, said valve assembly having a valve member and a buoyant float connected together with a valve member support stem to form a buoyant float assembly, and wherein the valve assembly attachment means comprises at least one deflectable leg member.

2. The vapor vent valve of claim 1 wherein said valve assembly comprises a valve housing having at least one open end, a float stop means opposite said open end, said housing defining an interior float area, slidably retaining said buoyant float assembly in the interior float area within the valve housing, said buoyant float assembly valve member extending towards said open end of said housing abutting said valve seat when fuel in said fuel tank buoys said buoyant float assembly upwards in the valve housing.

3. The vapor vent valve of claim 2 wherein said valve housing has at least one attachment tab for attaching the valve assembly to the valve assembly attachment means of the modular flange.

4. The vapor vent valve of claim 2 wherein when the buoyant float assembly is forced upwards completely in the valve housing, the valve member forms a seal against the valve seat of the modular flange.

5. The vapor vent valve of claim 4 wherein when fuel ceases to exert upward force on the float assembly, the float assembly slides downward until it rests against the float stop means, forming a gap between the valve member and the valve seat of the modular flange, allowing vapor to exit freely.

6. The vapor vent valve of claim 2 wherein when fuel ceases to exert upward force on the float assembly, the float assembly slides downward until it rests against the float stop means, forming a gap between the valve member and the valve seat of the modular flange, allowing vapor to exit freely.

7. A vapor vent valve for a fuel pump module comprising:
a valve assembly, said valve assembly having a valve housing having at least one open end, a float stop means opposite said open end, said housing defining an interior float area, slidably retaining a buoyant float assembly in the interior float area, said float assembly having a valve member extending towards said open end of said housing and a float, said float assembly valve member and said float connected by a cylindrical stem having a diameter smaller than a diameter of an aperture defined by a modular flange mounted to a fuel tank, said valve assembly releasably attaching to a bottom side of said fuel pump modular flange mounted to said fuel tank, said open end of the valve assembly facing said modular flange, said modular flange having a bottom side as a valve seat for said valve member, said valve seat defining a circumferential area around said aperture through said modular flange, said modular flange having at least one valve assembly attachment means proximal to the valve seat on the bottom side of said modular flange for attachment of the valve assembly to the modular flange aligned with the valve seat, said valve assembly attachment means comprising at least one deflectable leg member engaging with an attachment tab on the valve assembly.

8. The vapor vent valve of claim 7 wherein when float assembly is fully forced upwards in the valve housing, the valve member forms a seal against the valve seat of the modular flange.

9. The vapor vent valve of claim 8 wherein when fuel ceases to exert upward force on the float assembly, the float assembly slides downward until it rests against the float stop means, forming a gap between the valve member and the valve seat of the modular flange, allowing vapor to exit freely.

10. The vapor vent valve of claim 7 wherein when fuel ceases to exert upward force on the float assembly, the float assembly slides downward until it rests against the float stop means, forming a gap between the valve member and the valve seat of the modular flange, allowing vapor to exit freely.

* * * * *